United States Patent [19]

Delgado et al.

[11] 4,202,322
[45] May 13, 1980

[54] SOLAR ENERGY COLLECTOR AND HEAT EXCHANGER

[75] Inventors: Manuel M. Delgado, La Mirada; Harold N. Riise, La Canada, both of Calif.

[73] Assignee: Del Manufacturing Company, Monterey Park, Calif.

[21] Appl. No.: 795,947

[22] Filed: May 11, 1977

[51] Int. Cl.² .................................................. F24J 3/02
[52] U.S. Cl. ..................................... 126/425; 52/172; 165/81; 126/438; 126/443; 126/417
[58] Field of Search ............... 126/270, 271; 237/1 A; 350/294, 272, 310; 52/172; 165/81

[56] References Cited

U.S. PATENT DOCUMENTS

| | | | |
|---|---|---|---|
| 3,957,029 | 5/1976 | Nozik et al. | 126/270 |
| 3,999,536 | 12/1976 | Bauer et al. | 126/271 |
| 4,000,734 | 1/1977 | Matlock et al. | 126/271 |
| 4,038,971 | 8/1977 | Bezborodko | 126/271 |
| 4,038,972 | 8/1977 | Orrison | 126/271 |
| 4,061,130 | 12/1977 | Gonzalez | 126/271 |
| 4,077,392 | 3/1978 | Garner | 126/271 |
| 4,078,549 | 3/1978 | McKeen et al. | 126/271 |

Primary Examiner—William E. Wayner
Assistant Examiner—William E. Tapolcai, Jr.
Attorney, Agent, or Firm—John E. Wagner

[57] ABSTRACT

A solar energy collection system including a number of parabolic section reflectors mounted for rotation about their lines of focii. A drive system continuously rotates the reflectors at a one cycle per day rate in one form. Positioned at the line of focus of each reflector is a receiver tube carrying a heat exchange medium. The receiver tube is fixed and non-moving and is surrounded by a fixed transparent tube shielding the receiver tube from air currents. The transparent tube is sealed except for a leakage path through a desiccant containing chamber which is in thermal transfer relationship with the receiver tube and communicating with the ambient atmosphere. Means for cleaning the reflectors when in the inverted position is provided. Another embodiment provides for sun tracking and automatic night storage and cleaning. Novel mirror receiver tube and desiccant assembly features are disclosed.

21 Claims, 14 Drawing Figures

SOLAR ENERGY COLLECTOR AND HEAT EXCHANGER

BACKGROUND OF THE INVENTION

In recent years with impending and localized shortages of fossil fuels, increased attention is directed toward solar energy as a source of energy to supply electricity, heating and for other purposes. It has been recognized for some time that the sun, at peak conditions, radiates to the earth approximately 1 kilowatt per square meter, which if collected with reasonable efficiency, would constitute a tremendous source of supplementary energy to mankind.

On a small scale, energy has been collected and converted to other forms of solar energy. The silicon solar cell is a prime example, but to date has been limited in efficiency and is high in unit cost. In France, a solar furnace has been developed capable of producing several thousand degrees in a small furnace. Numerous patents have been issued on various forms of solar energy conversion.

One of the biggest problems, given the capability of collecting solar energy, is the exchange of that energy into another usable form, for example, hot water or steam. Flat plate collectors usually achieve only lower temperature differences ($\Delta T$) and thus inefficient collection. Large arrays of point focus collector mirrors are capable of higher ($\Delta T$) and are capable of steam generation systems, for example. The battery of mirrors constituting the collectors must, however, be constantly trained to track the sun. The focal point is concentrated and must be moved relative to the collector on tracking or maintained stationary with the relatively large collector moving about. In any event, to have a small focus with a medium extremely high in temperature is of little value unless that temperature can be imparted to a continuous stream of heated medium such as water or steam. This is achieved more practically in elongated rather than circular collector configurations.

One extremely practical limitation is that in any system in which the furnace or parts thereof must be moved, it usually requires movable joints and seals for the heat exchange medium. Movable seals in steam, hot water or other fluid systems are the bane of the power generating engineer's existence. Great lengths have been taken in generation systems to minimize the number of seals percent.

One other major problem in focused solar energy collection systems is that the collectors required must necessarily provide mirrored surfaces many square meters in size and be movable and track the sun. Often the tracking control and actuation system exceeds the collector in complexity.

With the foregoing state of the art in mind, the following objects of this invention are sought:
(a) a low cost, efficient mirror system;
(b) with a fixed receiver system;
(c) with simple low cost tracking system;
(d) with provision for simple tracking error correction;
(e) with provision for easy replacement of mirror sections;
(f) with provision for easy cleaning of mirror surfaces;
(g) with thermal efficiency in both night time as well as during collection periods;
(h) with provision for automatic maintenance of low moisture content receiver to maximize efficiency and reduce condensation;
(i) with a large array with a single solar tracker which allows the entire array to be controlled by a single tracker.

BRIEF STATEMENT OF THE INVENTION

Each of these objectives have been accomplished our invention comprising a number of elongated parabolic mirror assemblies mounted for rotation around their focus. A receiver tube is located at the focus of each mirror. The respective receiver tubes associated with each mirror are connected preferably in series and are filled with a heat exchange medium such as water. The receiver tubes are fixed and include no moving parts or seals and are connected to a low temperature sink and to a system for use of high temperature medium, e.g. steam at the output end of the system.

In one embodiment designed for North-South orientation, a clock motor and gear drive system is connected to each of the mirror assemblies to rotate them continously through 360 degrees in each 24 hour period to track the sun.

In another embodiment a plurality of collectors are arranged in an array for limited or non-continuous rotation under the control of a sun tracker and a minimum light intensity detector.

The receiver tubes are enclosed within sealed transparent tubes which communicate with a desiccant filled chamber surrounding the receiver tube. The desiccant chamber communicates with the exterior atmosphere. Temperature cycling of air contained within the transparent tube causes it to be alternately expanded and expelled to the atmosphere through the desiccant during daylight periods and cooler air drawn in through the desiccant during nighttime.

A series of jets for spraying the mirror surfaces with cleaning solution such as de-ionized water are positioned below the mirrors for cleaning during the night (non-illuminated) period.

The mirror of each assembly is formed from a plurality of elongated semi-parabolic sections, each mounted individually and each replaceable as required. The mirror sections are precise curvature second surfaced glass mirrors self supporting and held merely at localized positions and having the thermal expansion properties of glass.

A simple arrangement of removal and replacement of individual receiver tube sections and transparent tubes is provided.

A circuit for controlling the collectors for optimum and automatic operation including cleaning involves a dual control by a sun tracker and a light intensity sensor to track the sun throughout the day, and to invert the collectors at night and clean it.

BRIEF DESCRIPTION OF THE DRAWINGS

This invention may be more clearly understood from the following detailed description and by reference to the drawings in which:

FIG. 10a is a fragmentary perspective view of the mirror mounting arrangement of this invention;

DETAILED DESCRIPTION OF THE INVENTION

Figure 1:
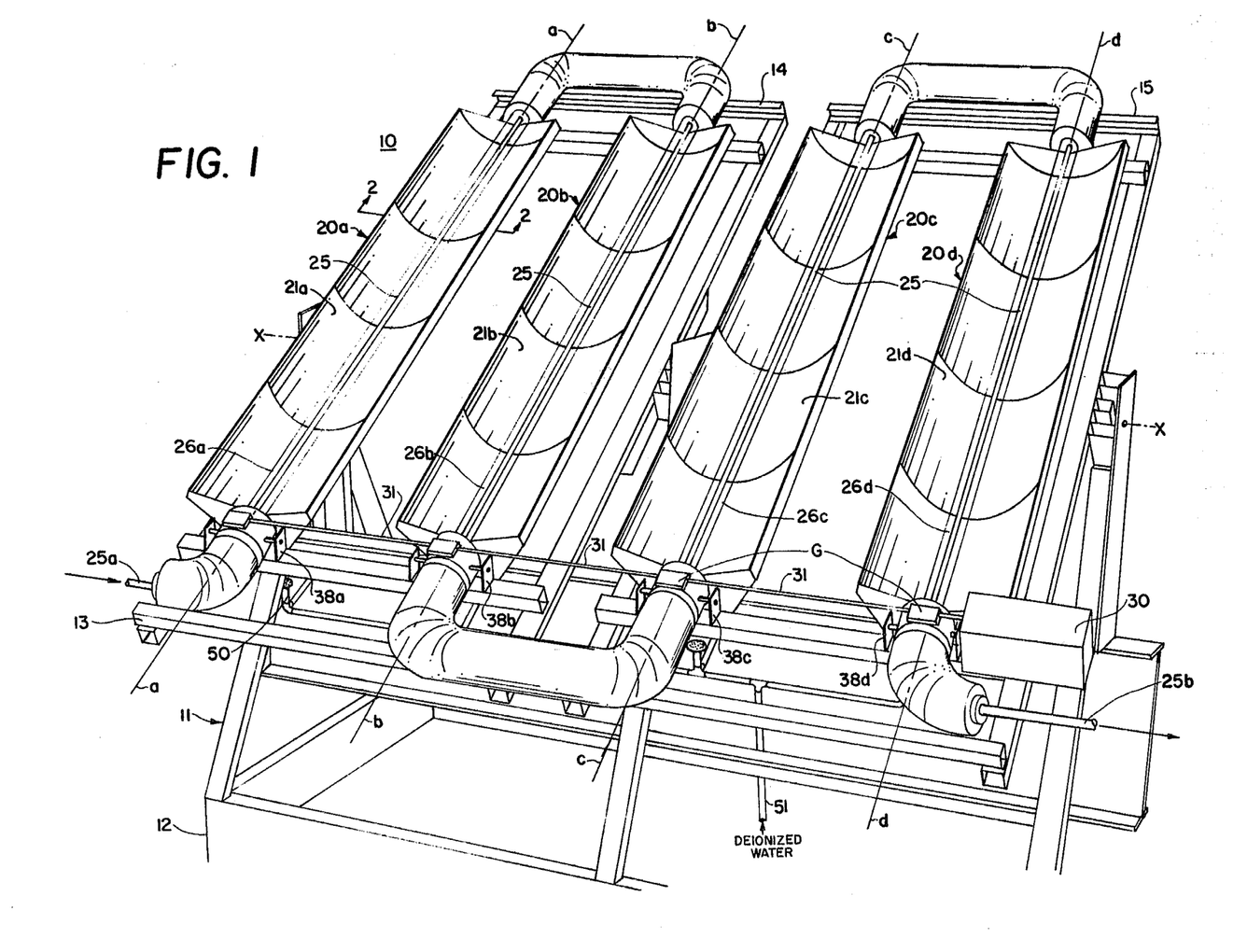
FIG. 1 is a perspective view of a solar collector-array incorporating this invention.

Now referring to FIG. 1, a solar energy collector module 10 is shown comprising a supporting frame 11, including a pedestal 12 designed to be mounted on a roof top or on the ground, and a movable cradle 13. The cradle 13 is pivoted about its lateral axis "X" to adjust for the geographical location and seasonal variations in the solar track. In this embodiment, the cradle 13 includes a pair of sub-cradles 14 and 15, each of which support two collector assemblies 20a and 20b, and 20c and 20d respectively.

Each collector assembly 20a–d includes an elongated parabolic mirror 21a–d, made up of a number, e.g. 8 semi-parabolic segments of second surfaced glass mirrors. The collector assemblies 20a–d are each mounted for rotation about their respective focus axes a, b, c and d.

A continuous receiver tube 25 enclosed within an enclosing transparent tube 26a–d extends through each collector assembly 20a–d coaxial with the lines of focus of each mirror 21a–d. The tubes 26a–d are also preferably coaxial with the respective axes a–d. The receiver tube 25 and transparent tube 26 are fixed and non-rotating. Their only movement is on a seasonal basis whenever the cradle moves about axis "X". Between the inlet 25a and outlet 25b, the entire receiver tube is fixed and has no moving seals. This is a significant advance over all collection systems with moving seals.

Figure 8:
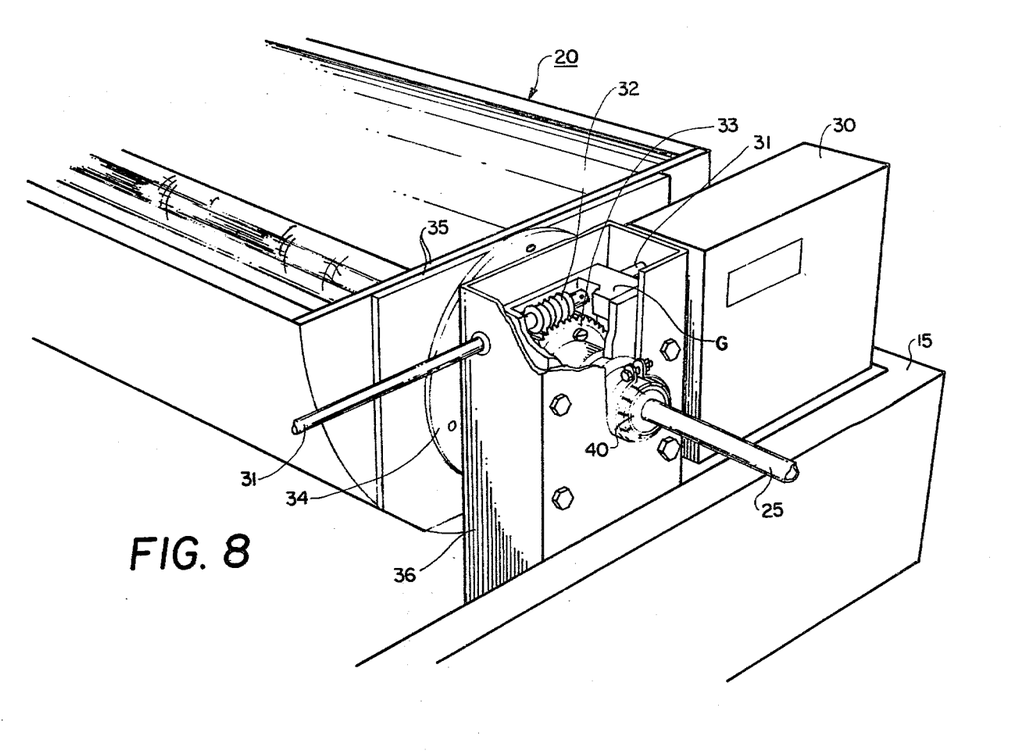
FIG. 8 is a fragmentary perspective view partly broken away of the mirror drive mechanism of this invention.

Now referring to FIG. 1 in conjunction with FIG. 8, a drive motor is contained in a housing 30 secured to the cradle 15 and through a gear train generally designated "G" shown in FIG. 8, including shaft 31, worm gear 32 and spur gear 33, the latter of which is secured to a flange 34. The flange 34 in turn is secured to an end plate 35 of the mirror 20. The gear 33 and flange 34 are journaled for rotation in a stanchion 36 secured to the cradle 15.

Operation of the motor contained in the box 30 causes rotation of shaft 31 and rotation of the mirror assembly 20. A suitable insulating bearing 40 allows rotation of the assembly 20 about the fixed receiver tube 25 without significant loss of thermal energy to the cradle 15. The receiver tube 25 is insulated as shown in FIG. 1 by encircling insulation such as 1½ inch thick foam insulation covered by resin bonded glass fiber skin.

The shaft 31 extends continuously along the module and engages each of the mirror assemblies through reduction gear assemblies "G" of the type shown in FIG. 8. As shown in FIG. 1, the gear assemblies are gimbal mounted to accommodate any slight mis-alignment between the shaft 31 and the mirror assemblies. It has been found that such gimbaling is not required and the mounting arrangement of FIG. 8 has been found to be fully satisfactory.

As mounted on cradles 14 and 15 and driven by the common shaft 31, all collector assemblies 20a–d turn in synchronism about their respective axes a–d driven by the common motor.

Figure 7:
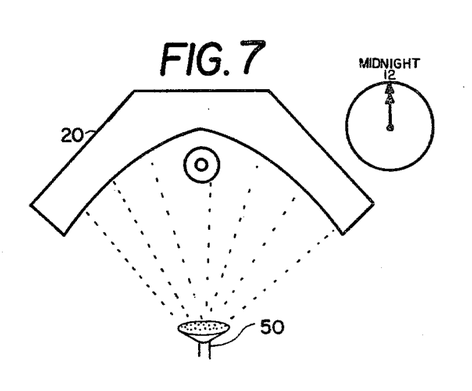

The motor is operated at a speed to provide one revolution of the collector assemblies per day. This allows tracking of the sun during the day and shielding of the receiver tube 25 from the night sky to prevent radiation of energy. A typical cycle is represented by FIGS. 3–7 which show the position of the collector assembly 20 during five representative periods of the day owing to the continuous movement. Also shown in FIG. 7 is a spray nozzle 50, one of several located under the collector assemblies 20a–d in FIG. 1 and supplied by pressure line 51 from a source of cleaning solution such as de-ionized water for spray cleaning of the mirrors and tube 26 as required. Since the collectors 20a–d of this invention are automatically inverted each day in the normal operation, dust particles are far less likely to accumulate than on flat plate collectors and trainable focussed collectors. However, the additional provision for washing the collector without human cleaning is provided in this invention.

Figure 2:
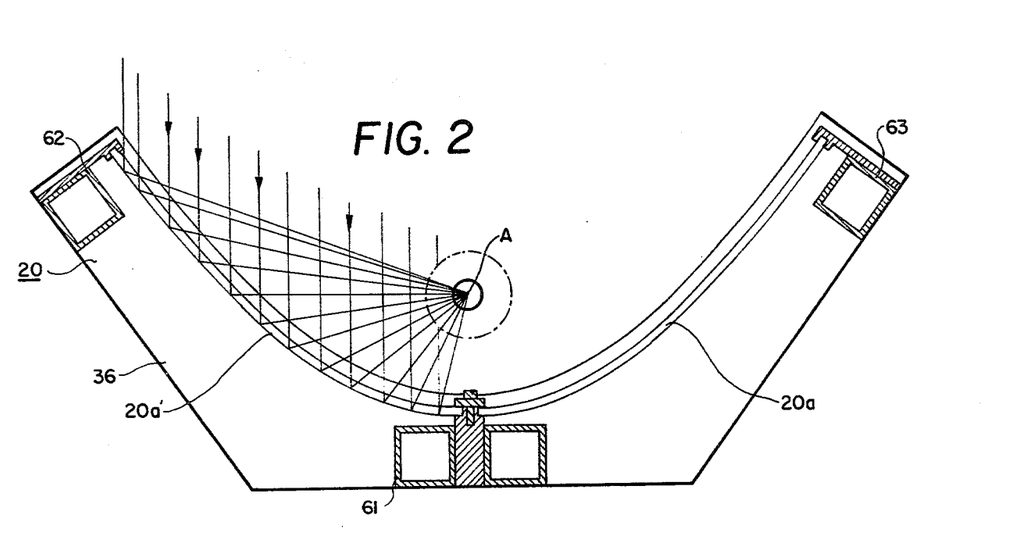
FIG. 2 is an enlarged vertical section through a single collector assembly of FIG. 1 taken along line 2—2 of FIG. 1.
Figure 3:
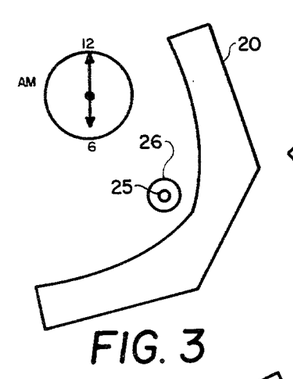
FIGS. 3-7 are simplified mechanical representations of the motion of the mirror assemblies.
Figures 4, 5:
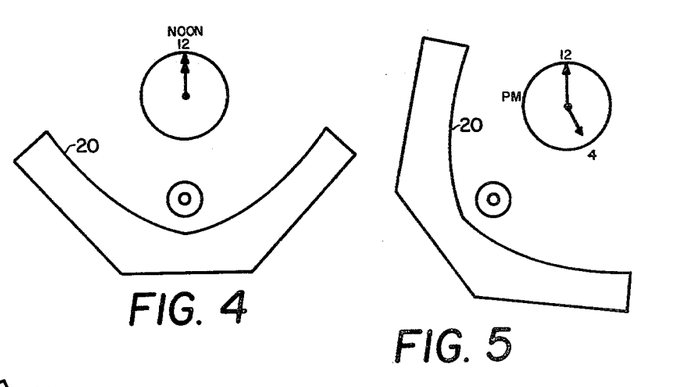
Figure 6:
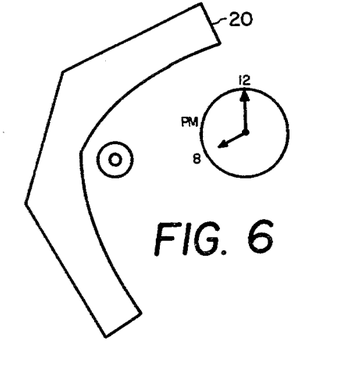

The details of the actual collection of solar energy is best understood by reference to FIG. 2 showing a single collector assembly 20 in its normal orientation toward the sun at all times. The collector assembly 20 includes as frame members a strong back member 61 and a pair of edge supports 62 and 63 interconnected by end plate 35 of FIG. 8 and 36 of FIG. 2. The frame members 61–63 each define elongated slots for holding the longitudinal edges of two mirror segments, 20a and 20a'. Each mirror segment is of semi-parabolic section, for example 12 inches wide and 24 inches long. The mirror components are assembled and held by the frame to define the line of focus denoted by axis "A" which also is the axis of rotation of the collector assembly 20. The receiver tube which preferably is ½ inch o.d. 0.028" wall thickness and of drawn seamless steel tube with a black chrome over dull nickel finish to enhance energy absorption. The receiver tube envelope, tube 26 is preferably 38 mm o.d.×2 mm wall Pyrex glass tubing conforming to Federal Specification DD-541 type 1, class A. The reflective mirror glass is preferably G double strength low iron (0.01%) sheet conforming with Federal Specification DD-G-451c. The tube 25 carries a heat exchange medium such as water or such commercial products as Therminol 55 produced by Monsanto Industrial Chemicals Company of St. Louis, Missouri, 63166.

The mirror segments are individually mounted so they may be removed and replaced during early or daylight hours easily without removing the module from service. The mirror segments themselves are precise optical elements yet low in cost when produced in accordance with the method and apparatus disclosed in my copending patent application, Ser. No. 792,773 filed May 2, 1977, now U.S. Pat. No. 4,105,429.

The transparent tube 26 surrounding receiver tube 25 serves to shield the tube 25 from air currents which would cool the receiver tube 25 and reduce the efficiency of the system. The tube 26 is sealed except for a pressure relief and atmosphere drying feature as shown in FIG. 9.

Figure 9:
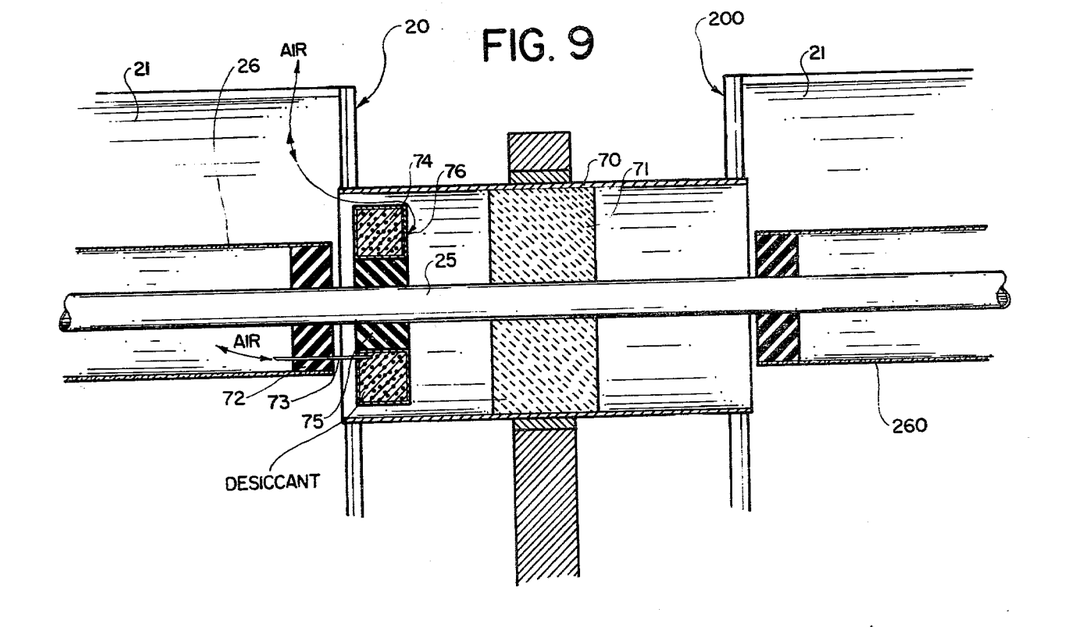
FIG. 9 is a vertical sectional view through the atmosphere control portion of the receiver section of this invention.

Referring now to FIG. 9 which is a sectional view through a collector-receiver assemblage showing tandem aligned collectors 20 and 200, collector 20 includes mirror 21, receiver tube 25 (common to both collectors 20 and 200) and transparent tubes 26 and 260. The receiver tube 25 is supported in a cylindrical support tube 70 by a ceramic spacer 71. The transparent tube 26 is located coaxially around a length of receiver tube 25 by a silicone rubber end plug 72. Extending through end plug 72 is a hypodermic type needle 73 with its opposite end extending into a desiccant filled annular chamber 74. The chamber is supported on receiver tube 25 by a silicone rubber insulator 75 through which heat energy from tube 25 serves to dry the desiccant. Moisture evaporated from the desiccant and excess air pressure from the tube 26 exits from the chamber 74 to the atmosphere through aperture 76. A suitable desiccant is silica gel or others may be used. The insulator 75 is selected in density and thickness to provide a normal 250 degree-300 degree F. within the chamber 74 during the day to dry out the desiccant each day.

In operation during the heat of the day the temperature of the air within the tube 26 increases and as the air expands it exits through needle 73, chamber 74, and exits through opening 76. Moisture in the air expelled is trapped by the desiccant and continued heating of the desiccant drives the moisture out through the same aperture 76. As night-time approaches the air flow path reverses and any moisture in the indrawn air is captured by the desiccant in chamber 74. Thus, the tube 26 is pressure relieved and supplied with dry air to avoid condensation within the tube 26 and reduced thermal efficiency. A similar arrangement for the tube 260 and any others in the array is present providing for automatic atmosphere control within the tube 26.

The above described embodiment encompasses a system noted for its simplicity in mirror design and continuous mirror rotation by a single synchronous motor. It is particularly suitable for North-South orientation.

We have also designed a system requiring substantially simpler and lighter support system and one in which a single motor controlled by a sun tracker drives a large number of collectors with a minimum of electrical energy per square foot of collector area. This embodiment is particularly suitable for East-West orientation.

Figure 10:
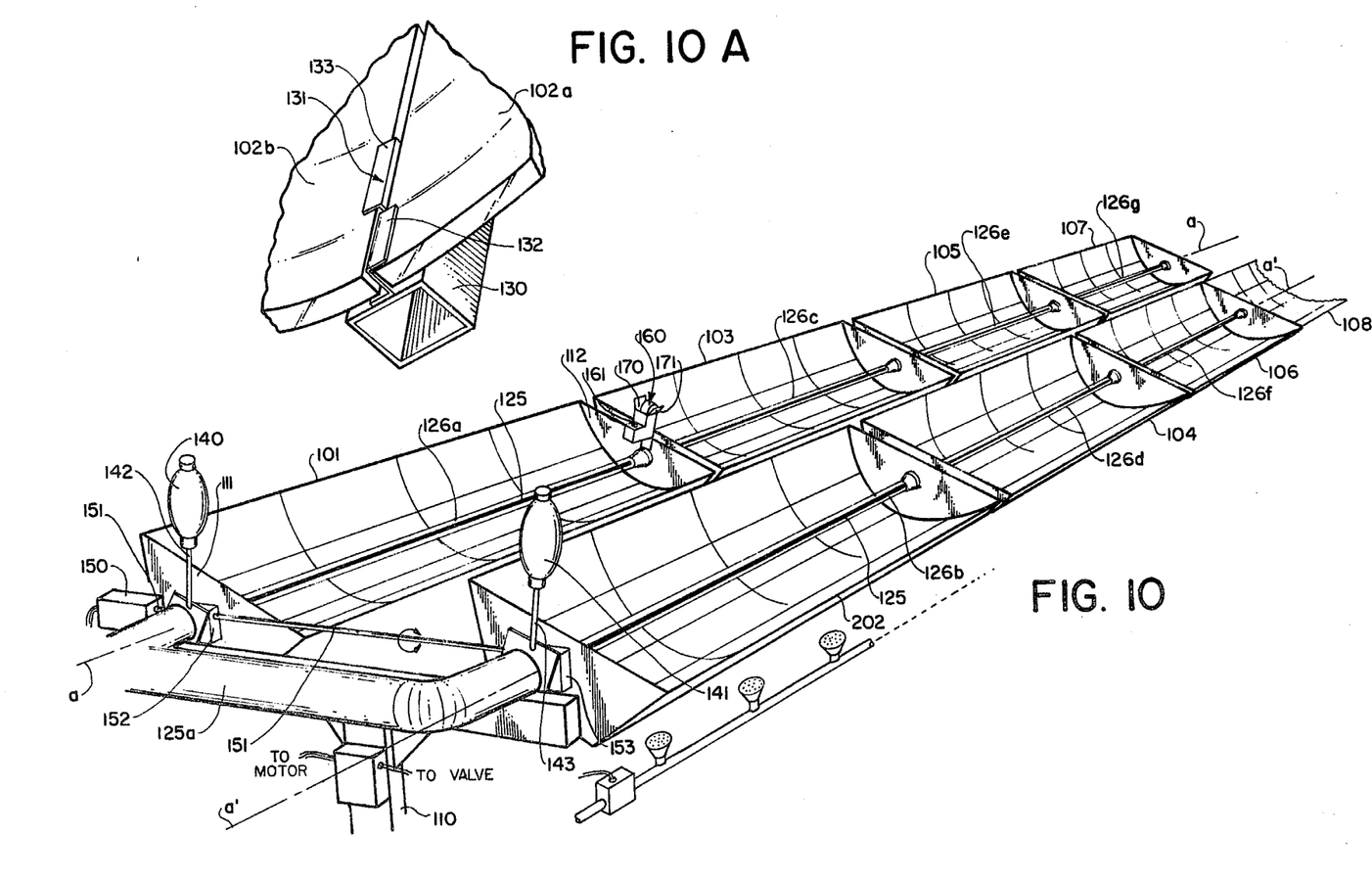
FIG. 10 is a perspective view of an alternate embodiment of this invention.

This embodiment appears in FIG. 10 and attention is directed to FIG. 10 for the overall combination of an array 100 of for example 8 collector assemblies of which 7 appear in the drawing numbered 101-107 in two banks, both mounted on a "T" shaped support 110 which rotatably mounts about the axes a and a' centered on the receiver tube 125. Interconnecting the two sections of tube 125 is an insulated section 125a rigidly mounted on support 110. As in the case of the embodiment of FIGS. 1-8, the receiver tube 125 is fixed and located at the line of focii of the respective collector banks 101, 103, 105 and 107 and 102, 104, 106 and 108 shown in fragment only.

The collectors typified by 101 include end plates 111 and 112 and 16 mirror segments each having the required precise curvature to focus incident solar energy on a line of focus approximately 0.1 in width at the receiver tube having a diameter of one half inch. The receiver 125 diameter is in the order of less than 1/30 the aperture W of 20 inches. Thus the line of focus of a collector is in the order of 1/100 of the aperture W. This degree of accuracy is due in part to the accuracy in mirror production employing the method disclosed in the co-pending patent referenced above.

The accuracy is also achieved since the mirrors are self supporting, i.e. constituting only silvered glass which is locally supported in a frame. Local support is preferably edge support as illustrated in FIG. 10a which is an enlarged fragmentary view of a support. In FIG. 10a, a square tube 130 is unshown in FIG. 10 but runs longitudinally along the joints between mirror sections appearing in that figure.

Secured to the tube 130 are a plurality of clips 131, one of which appears in FIG. 10a. The clips 131 have one upward and one downward extending tab 132 and 133 holding a pair of mirror sections 102a and 102b respectively. The mirror sections have limited free movement within the clips so thermal expansion allows the mirrors to expand without distortion from their support. Typically four such clips hold one mirror but three will do. The mounting arrangement as shown also results in a comparatively light support structure for the mirror array. This reduces cost and particularly when mounted on an existing roof constitutes acceptable additional roof load.

As in the case of the earlier embodiment, the collectors 101, 103, 105, 107 and 102, 104, 106, 108 of FIG. 10 rotate about the fixed receiver tube 125 and its encircling transparent wind shield tube 126 a-g. The collectors are balanced about the respective axes a and a' by counter weights 140 and 141 on arms 142 and 143 secured to the bearing assemblies of their collectors.

Given the balanced collector as shown, only a small fractional horse power reversible motor 150 is required to drive a large array. This is accomplished through shaft 151, gear box 152 for collector 101, 103, 105, 107 and continuation of shaft 151 and gear box 153. With this arrangement a one tenth horsepower motor can easily drive an array of 128 square feet of mirror.

The motor 150 is under the control of a sun tracking servo follow-up system including sun tracker assembly 160 mounted on a collector and a minimum light sensor 161 mounted almost any place on the system.

The sun tracker may be the Sun-Loc-1 produced by Delevan Electronic Inc. of Scottsdale, Arizona or other similar device including a pair of sensors 170 and 171, each viewing a field on opposite sides of the normal axis "Y" of the array. The sensors produce electrical signals related to the incident light intensity which signals are combined and processed in accordance with known servo techniques to produce an error signal controlling the motor 150 to drive the motor to a zero error position.

Figure 11:
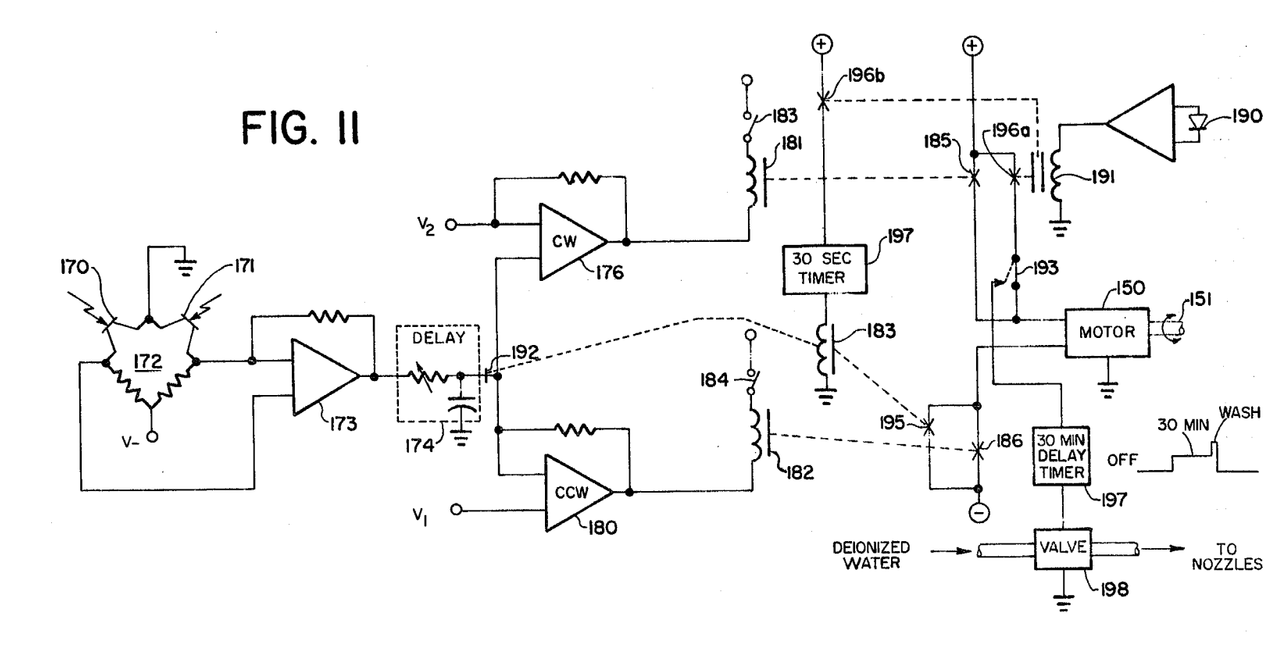
FIG. 11 is an electrical schematic diagram of a control and tracking circuit of this invention.

A suitable control circuit appears in FIG. 11 showing the solar sensors 170 and 171 as two arms of a bridge circuit 172. Signal unbalance from the bridge 172 is introduced into differential amplifier 173 producing a signal of polarity indicative of the unbalance between the output of sensors 170 and 171. After delaying the signal through RC circuit 174, the error signal thus produced is amplified in either clockwise signal amplifier 176 or counter-clockwise signal amplifier 180 to operate its control relay 181 or 182 respectively driving the motor 150. Two position responsive mercury switches 183 and 184 limit the angular travel of the collector arrays. The relays 181 and 182 through their respective normally open contacts 185 and 186 apply power to the motor 150 in the appropriate direction. The foregoing is illustrated as a suitable servo control system although it is recognized that other different or more complex systems may be used.

Also coupled to the motor 150 and in disabling relationship to servo system disabled above is a light intensity sensor 190 holding a relay 191 normally operated during daylight hours. When the ambient light level drops to a selected level, relay 191 is released closing contacts 196a & b. Relay 191 is an alternate drive motor supply circuit for motor 150 and opening the relay contacts 192 in the servo circuit. The motor 150 is then powered and limit switches 181 and 182 disabled. The motor is then driven until mechanical limit switch 193 is operated terminating the power to motor 150. Typically the switch 193 is positioned to open when the collector is inverted. When the sensor 190 is energized in the morning, the process reverses and the servo system takes over after the relay 191 is again energized and reset contacts 195 are closed by a timer 197, e.g. operating long enough to drive the collector past its limit switches 181 and 182. Thus the system is under dual control to track the sun during daylight hours and be inverted during the hours of darkness.

The limit switch 193 operated when the collectors are inverted energizes a timer 197 which controls valve 198 to provide wash solution to the collector mirror surfaces. The timer 197 has a timing cycle as illustrated in the drawing. After energization by switch 193, it commences a timing cycle for a period, e.g. 30 minutes to several hours. The minimum period is to allow the mirrors to cool and any longer period may be warranted to stagger the washing of several such arrays. The wash period may be controlled as well from a few seconds to a few minutes, whatever is required for effective cleaning.

Figure 12:
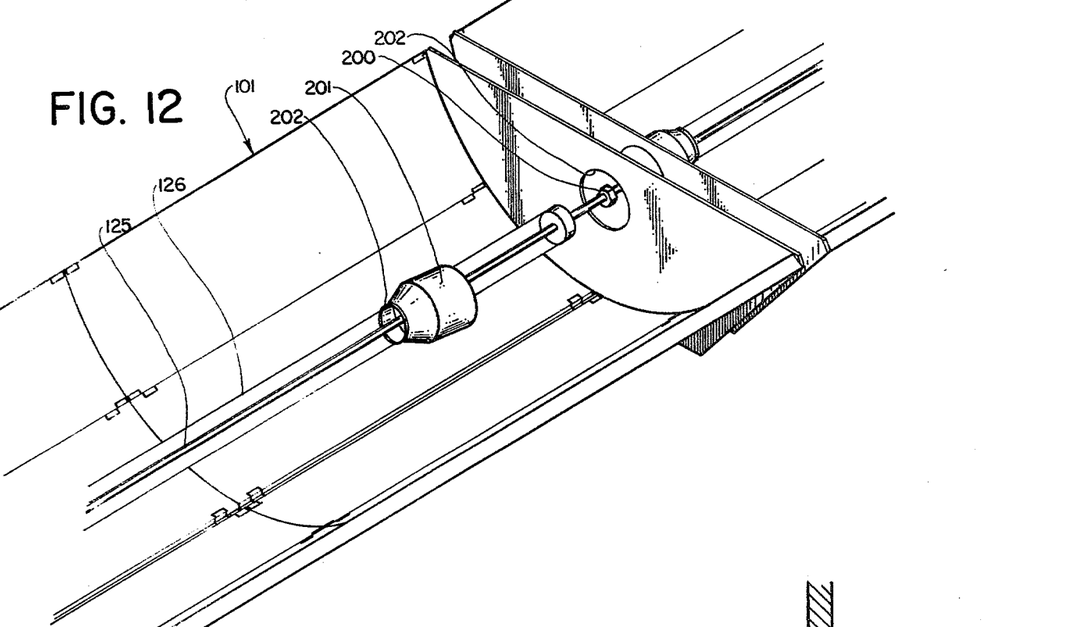
FIG. 12 is a fragmentary perspective view of a mounting feature of this invention.
Figure 13:
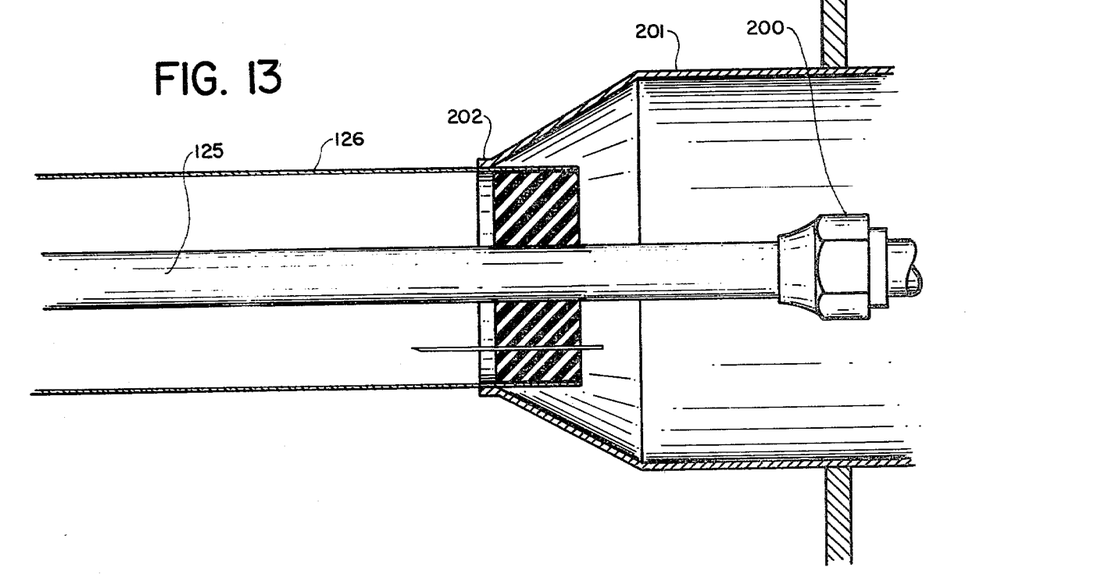
FIG. 13 is a fragmentary vertical sectional view of the mounting feature of this invention.

One of the other important features of this invention is particularly apparent in FIGS. 12 and 13 showing the receiver-transparent tube 125 and 126 mounting arrangement. As seen in these figures, tube 125 need not be continuous structurally but may have joints as typified by flare fitting 200, the nut of which appears in FIG. 12. The tube 126 is centered by sleeve 201 which includes a throat 202 dimensioned to receive the tube and to allow its slight movement without thermal expansion. The body of sleeve 201 enters on aperture 202 in the end wall of the collector 101.

As shown in these figures, each receiver tube 125 section and transparent tube 126 may be removed and replaced in a matter of a few minutes. Likewise, the mirror sections are each removable by simply disengaging two of the clips holding it in place and removing the mirror section and replacing it.

Of similar significance throughout this invention and particularly illustrated by 10a is the fact that the mirrors are each self supporting and loosely mounted eliminating any seismic or wind loading stresses to be transferred from the collector frames to the mirror sections. Further as shown in FIG. 1, the individual collectors are mounted via universal joints 38a–d so no such loading from the support 11 is transferred to the collectors. Thus, the dimensional accuracy obtainable in the mirror sections is not lost from its support system.

The above described embodiments of this invention are merely descriptive of its principles and are not to be considered limiting. The scope of this invention instead shall be determined from the scope of the following claims, including their equivalents.

What is claimed is:

1. A solar energy collection system comprising an elongated collector dimensioned to concentrate solar flux into a concentrated linear region;
   a fixed receiver tube extending along said region;
   means mounting said collector for rotation about an axis located in said region;
   means for powering the rotation of said collector to keep solar image on the receiver tube;
   means supplying said receiver tube with a source of heat exchange medium;
   outlet means for receiving the heat exchange medium after passage through said receiver tube; and
   transparent means encircling said receiver tube for isolating said receiver tube from air currents in the region of said collector and receiver tube: wherein said means for powering said collector is operative to drive said collector through a 360 degree rotation.

2. The combination in accordance with claim 1 wherein said drive means is operative to drive said collector continuously through said 360 degrees of rotation during each 24 hour period.

3. The combination in accordance with claim 1 wherein said collector is of generally parabolic sectional shape and said receiver tube is located at the focus of said parabola and said collector is journaled for 360° rotation around the axis of the parabola.

4. The combination in accordance with claim 1 including means for washing said collector positioned to direct streams of cleaning fluid at said collector when said collector is a non-solar oriented position.

5. The combination in accordance with claim 4 wherein said washing means comprises a plurality of upward directed nozzles positioned below said collector.

6. In a solar collection system including an energy collector, a receiver located to receive energy from said collector containing a heat exchange medium, a light transparent wind shield enclosing said receiver and a desiccant material for absorbing moisture accumulating in said wind shield, the improvement comprising:
   means defining a chamber for holding said desiccant material;
   means substantially sealing said wind shield;
   means providing restricted communication between the interior of said wind shield and said chamber;
   said chamber being in thermal transfer relationship between the desiccant material within said chamber and said receiver;
   said means defining said chamber also defining an outlet aperture from said chamber to the atmosphere whereby air within said wind shield, when heated by solar radiation, exhausts excess pressure to the atmosphere via said chamber and on cooling receives air via said chamber and said desiccant material and said chamber is heated by said receiver; wherein a plurality of collectors are positioned end for end with said receiver tube extending therebetween including bearing means between each collector and said chamber is located between said collectors on said receiver tube.

7. The combination in accordance with claim 6 wherein said receiver tube includes a joint between at least certain of said end for end collectors whereby individual wind shields and desiccant chambers may be removed and replaced.

8. In a solar collection system including an energy collector, a receiver located to receive energy from said collector containing a heat exchange medium and a light transparent wind shield enclosing said receiver, the improvement:

wherein said collector comprises a plurality of concave glass mirror sections of elongated shape;

mounting means for said mirror sections comprising a frame work and means locally confining said mirror sections for thermal expansion movement independent of thermal expansion movement of said mounting means;

wherein said confining means comprises a plurality of clips secured to said frame work and partially encircling the edge of said mirror sections.

9. A solar energy collection system comprising:

a plurality of elongated focussing collectors each having a line of focus;

means mounting said elongated collectors for rotational movement about the line of focii of said collector;

a fixed receiver tube extending along the line of focii of said collectors;

means coupled to said collectors for sensing the direction of maximum incident solar radiation;

motor means coupled to said collectors and to said sensing means for rotating said collectors to track the sun;

means for limiting the extent of rotation of said collectors;

said limiting means operative to disable said motor means;

means for sensing a drop in ambient light level at said system;

said last means operative to disable said limiting means and for energizing said motor means to drive said collectors to a preselected position.

10. The combination in accordance with claim 9 wherein said last means energizes said motor means until said collectors are driven to an inverted position.

11. The combination in accordance with claim 9 wherein said last means is operative responsive to increased ambient light level to enable said motor means to drive said collectors to an energy collecting position and for re-enabling said limiting means.

12. The combination in accordance with claim 9 including a plurality of cleaning means directed toward said collectors;

said last means of claim 9 being operative to enable the rotation of said collectors into cleaning position and for enabling said cleaning means.

13. The combination in accordance with claim 12 wherein said cleaning means comprises a valve connected to a supply of cleaning solution and a plurality of nozzles controlled by said valve;

and said last means of claim 9 is operative to energize said valve and allow the application of cleaning solution to said collectors.

14. The combination in accordance with claim 13 wherein said nozzles are upward directed and said last means of claim 9 is operative to drive said motor means to invert said collectors over said nozzles to be cleaned by solution therefrom.

15. A solar energy collector system comprising a plurality of elongated focussing collectors, each having a line of focus;

means mounting a plurality of said elongated collectors in parallel axis side by side relationship and for angular movement about said axes through 360° of rotation;

a fixed receiver tube extending along the line of focii of each of said collectors and interconnected at the ends thereof;

motor means for driving said collectors; and common means coupling said motor means to drive said collectors synchronously.

16. The combination in accordance with claim 15 wherein said motor means is positioned adjacent to one end of said collectors and said coupling means comprises a shaft coupled to said motor and reduction gear means for reducing the speed of rotation of said collectors to the order of one revolution per day.

17. The combination in accordance with claim 15 including transparent tube means encircling said receiver tube in the regions where it passes through said collectors and including means between end for end positioned collectors for decoupling said receiver tube whereby said receiver tube and transparent tube may be replaced without interference with any of the collectors.

18. The combination in accordance with claim 15 wherein said collectors comprise a plurality of self supporting parabolic section glass mirrors and frame members holding said mirrors at localized positions only.

19. The combination in accordance with claim 18 wherein said frame members support said mirrors at edge regions only.

20. A solar energy collector system comprising a plurality of elongated focussing collectors, each having a line of focus;

means mounting a plurality of said elongated collectors in parallel axis side by side relationship and for angular movement about said axes;

a fixed receiver tube extending along the line of focii of each of said collectors and interconnected at the ends thereof;

motor means for driving said collectors;

common means coupling said motor means to drive said collectors synchronously;

including a plurality of end for end positioned additional collectors;

said end for end positioned additional collectors mechanically coupled to respective side by side collectors for movement therewith;

means mounting said additional collectors for angular movement about said axes;

said receiver tube extending through said additional collectors along the respective axes thereof to provide a fixed path for heat exchange medium through said receiver tube.

21. A solar energy collector system comprising a plurality of elongated focussing collectors, each having a line of focus;

means mounting a plurality of said elongated collectors in parallel axis side by side relationship and for angular movement about said axes;

a fixed receiver tube extending along the line of focii of each of said collectors and interconnected at the ends thereof;

motor means for driving said collectors;

common means coupling said motor means to drive said collectors synchronously;

including transparent tube means encircling said receiver tube in the regions where it passes through said collectors and including means between end for end positioned collectors for decoupling said receiver tube whereby said receiver tube and transparent tube may be replaced without interference with any of the collectors;

wherein said transparent tube means is substantially sealed except for a restricted opening;

means positioned between end for end positioned collectors for defining a desiccant containing open chamber; and means communicating said restricted opening of said transparent tube within said chamber in thermal transfer relationship with said receiver tube in the region between end for end positioned collectors.

* * * * *